United States Patent [19]
Malgarini et al.

[11] 3,982,900
[45] Sept. 28, 1976

[54] PLATE FOR FLUID-BED REACTORS

[75] Inventors: Giansilvio Malgarini; Edoardo Pasero, both of Rome, Italy

[73] Assignee: Centro Sperimentale Metallurgico S.p.A., Rome, Italy

[22] Filed: June 16, 1975

[21] Appl. No.: 587,236

[30] Foreign Application Priority Data
June 17, 1974 Italy .................... 51565/74

[52] U.S. Cl. .................... 23/284; 23/288 S; 423/659; 239/556; 239/553.3; 239/597; 34/57 A
[51] Int. Cl.² .................... F26B 25/10; B01J 8/44
[58] Field of Search .................... 23/284, 288 S; 423/659 F; 239/556, 553.3, 597, 596; 34/57 A; 261/113

[56] References Cited
UNITED STATES PATENTS

| | | |
|---|---|---|
| 2,529,366 | 11/1950 | Bauer .................... 23/284 X |
| 2,740,698 | 4/1956 | Helwig .................... 23/288 S |
| 2,872,472 | 2/1959 | Fenske et al. .................... 23/284 X |
| 2,975,037 | 3/1961 | Lake .................... 23/284 X |
| 3,404,845 | 10/1968 | Schmeling et al. .................... 23/284 X |
| 3,746,516 | 7/1973 | Michaud .................... 23/284 X |

*Primary Examiner*—James H. Tayman, Jr.
*Attorney, Agent, or Firm*—Young & Thompson

[57] ABSTRACT

A plate for fluid bed reactors to insure uniform distribution of the fluidizing gas, comprises a pair of spaced opposed plates having holes therethrough, the holes in one plate being staggered relative to those of the other plate. The peripheral holes are larger than the central holes. The holes in the upper plate have upper frusto-conical parts and lower cylindrical parts, while the holes in the lower plate have upper cylindrical parts and lower frusto-conical parts. The plates have central holes closed by frusto-conical plugs operable from outside the associated apparatus to discharge material from the plate.

7 Claims, 3 Drawing Figures

PLATE FOR FLUID-BED REACTORS

The present invention relates to a plate for the uniform distribution of gas in a fluidized bed and, more precisely, to a plate to ensure uniform contact between the solid particles and the reaction gas in a fluid bed across the entire cross section of the bed, particularly to improve such contact near the walls of the reactor.

There are many known devices for the distribution of gas in fluidized beds proposed for the purpose of uniformly distributing the fluidizing gas throughout the mass of such beds. These devices have certain drawbacks, such as the tendency to form hot spots near the nozzles and/or the walls of the reactor, resulting in the agglomeration of the solid particles treated and hence in the possibility of the bed becoming defluidized. Another drawback found with earlier devices was their complex construction and thus their relatively high cost. Yet a further drawback was the tendency of the treated particles to clog the nozzles, modifying the flow of gas through the bed and causing its defluidization. The cause of these difficulties lies in that the devices known at the present state of the art do not ensure uniform distribution of gas near the distribution plates or gratings, which in itself is a very serious drawback since it results in unsatisfactory gas-solid contact. This causes local dead areas, with the formation of hot spots and agglomeration of the solid particles and the subsequent defluidization of the bed.

Thus an object of the present invention is to provide a plate for the distribution of gas in a fluidized bed which distributes the fluidizing gas in a substantially uniform manner, avoiding the formation of hot spots.

Another object of this invention is to provide an inexpensive gas distribution plate of very simple construction.

A further object of the present invention is to provide a gas distribution plate which prevents clogging of the plate nozzles.

Other objects and advantages of this invention will become apparent from the following description, in which the invention is discussed in relation to the accompanying drawing, in which.

Figure 1:
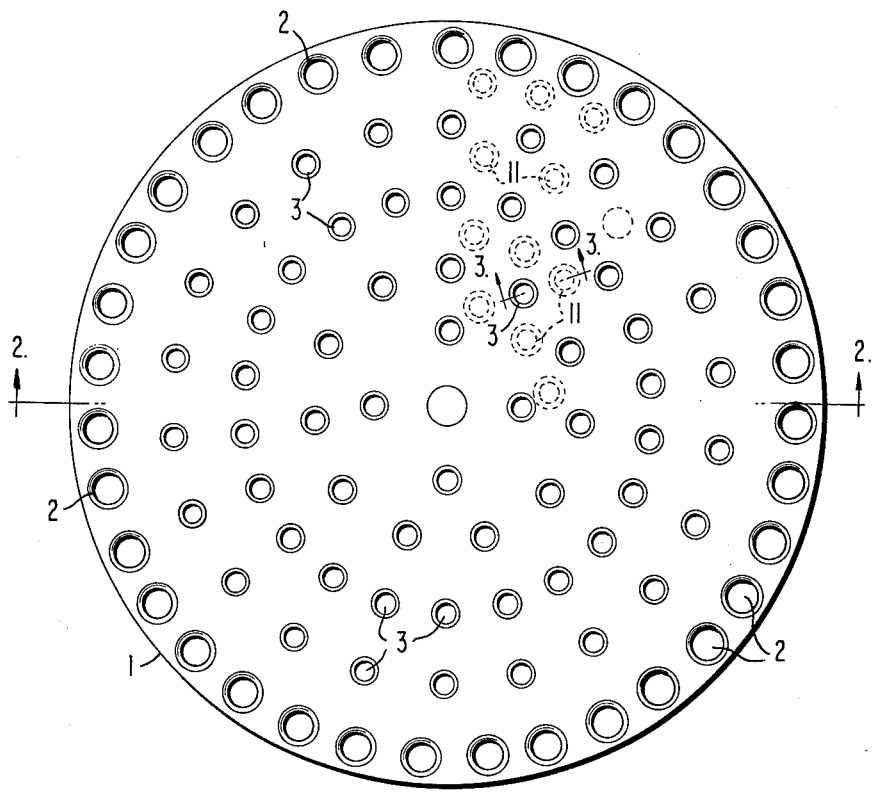
FIG. 1 is a plan view of a plate according to the present invention.

Referring now to the drawing in greater detail, there is shown a distributing plate according to the present invention, comprising a first upper plate 1 in direct contact with the fluidized bed. Plate 1 has a plurality of through holes 2, 3 to ensure uniform distribution of the gas entirely across the reactor, from the very bottom of the fluidized bed. Between this plate and a second lower plate 6, also provided with a plurality of through holes, there is a space 7. The distance between plates 1 and 6 that is, the width of space 7, is less than the thickness of either of plates 1 and 6.

Thus the plate 1, which may be circular in form, is provided with a plurality of first holes 2, in a circumferential series parallel to the outer edge of the plate, and with a plurality of second holes 3 radially inward of said first holes 2, said first and second holes being through holes, and having a first frusto-conical part with a 90° aperture, the widest base of which points upward to the top face of the plate and to the fluidized bed superimposed on said plate, and a second cylindrical part connecting the smaller base of said frusto-conical part to the lower face of the plate. The first holes 2 have a bigger cross section than the second holes 3 and, for example, if the diameter of the cylindrical part of the first holes is 4 mm, the diameter of the second holes will be 3 mm or less.

With this layout and this hole form uniform distribution of gas is secured over the whole width of the fluidized bed, thus preventing the formation of hot spots and ensuring that the fluidized particles do not clog the inlet of the holes, while maintaining a high velocity of fluidizing gas through the plate.

Figure 2:
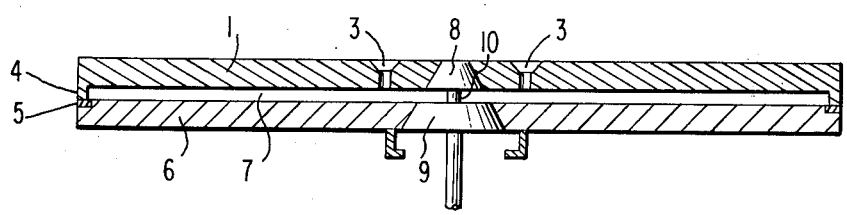
FIG. 2 is a cross-section through the FIG. 1 plate along line 2—2.
Figure 3:
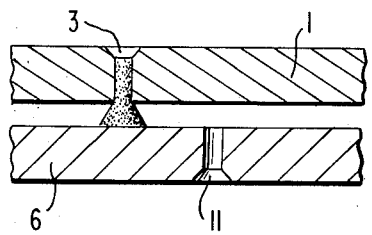
FIG. 3 is an enlarged cross-section of part of a plate along line 3—3 of FIG. 1.

As can be seen from FIGS. 2 and 3, the plate consists of a first upper plate 1, shown also in FIG. 1, above which the fluidized bed is established, connected via the rim 4 and gasket 5 to a second lower plate 6 spaced below the upper plate, which also has a number of holes 11, some of which are shown by broken lines in FIG. 1, whose distribution and form are the same as those in plate 1, but with the widest base of the frusto-conical part directed toward the lower face of plate 6. The holes in plate 6 are staggered between those in plate 1, so that when there is no flow of fluidizing gas the solid particles of the bed which penetrate into space 7 and form small piles, with a given angle of repose on lower plate 6, can not fall through the lower plate, thus emptying the reactor. To this end, the distance by which the holes 11 are laterally staggered from the closest superjacent holes 2 or 3, is greater than the distance between plates 1 and 6.

The layout of the holes described above also provides a uniform distribution of temperature along the upper plate 1, which is evenly surrounded and heated by the gases which penetrate into space 7 through the holes in plate 6. The layout also ensures more uniform distribution of the flow of gases through holes 2 and 3 of plate 1.

Plates 1 and 6 have each a cone-shaped plug 8 and 9, respectively. The plugs are interlinked by a connecting element 10 and can be actuated from outside by a control which is not shown, so they can be moved vertically to discharge the bed when necessary. The smaller ends of plugs 8 and 9 point upward. There can be more than one plug per plate, depending on the dimensions of the plate.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A plate for fluid bed reactors, comprising spaced upper and lower plates having holes therethrough, the holes in the upper plate being staggered relative to the holes in the lower plate, said holes having frusto-conical enlargements at one end thereof, the frusto-conical enlargements of the holes in the upper plate being at the upper ends of the holes of the upper plate and the frusto-conical enlargements of the holes of the lower plate being at the lower ends of the holes of the lower plate.

2. A plate as claimed in claim 1, the distance between the plates being less than the thickness of the plates.

3. A plate as claimed in claim 1, the distance by which the holes in one plate are laterally staggered from the closest holes in the other plate being greater than the distance between the plates.

4. A plate as claimed in claim 1, there being a series of peripheral holes in each plate and a plurality of central holes in each plate, said peripheral holes being of larger diameter than said central holes.

5. A plate as claimed in claim 1, and a rim at the periphery of one of said plates interconnecting the two said plates.

6. A plate as claimed in claim 1, and frusto-conical plugs closing frusto-conical openings in the central portions of said plates, and means to raise and lower said frusto-conical plugs thereby to open the central portions of said plates to discharge material from said plates.

7. A plate as claimed in claim 6, said frusto-conical plugs being coaxial with each other and with the plates, the larger bases of the frusto-conical plugs being their lower bases, the frusto-conical plug of the lower plate being of larger diameter than that of the upper plate.

* * * * *